United States Patent
Uchida et al.

[11] Patent Number: 6,060,187
[45] Date of Patent: May 9, 2000

[54] SOLID POLYMER TYPE FUEL CELL AND METHOD FOR MANUFACTURING THE SAME

[75] Inventors: Makoto Uchida, Hirakata; Yuko Fukuoka, Kyoto; Yasushi Sugawara, Neyagawa; Nobuo Eda, Hirataka, all of Japan

[73] Assignee: Matsushita Electric Industrial Co., Ltd., Osaka, Japan

[21] Appl. No.: 09/056,686

[22] Filed: Apr. 8, 1998

[30] Foreign Application Priority Data

Apr. 22, 1997 [JP] Japan .................................. 9-104470

[51] Int. Cl.[7] ........................... H01M 8/10; H01M 2/08; H01M 6/00; B05D 5/12
[52] U.S. Cl. ............................... 429/30; 429/42; 427/115; 29/623.5
[58] Field of Search .......................... 427/115; 29/623.5; 429/30, 42

[56] References Cited

U.S. PATENT DOCUMENTS

| 5,211,984 | 5/1993 | Wilson | 427/115 |
| 5,723,173 | 3/1998 | Fukuoka et al. | 427/115 |

FOREIGN PATENT DOCUMENTS

| B 62-61118 | 12/1986 | Japan . |
| B 62-61119 | 12/1986 | Japan . |
| A3 184266 | 8/1991 | Japan . |
| A3 295172 | 12/1991 | Japan . |
| 536418 | 2/1993 | Japan . |

OTHER PUBLICATIONS

Hawley's Condensed Chemical Dictionary, 11th ed., pp. 299–300, 1987. no month available.

Concise Chemical Dictionary, p. 149, 1984. no month available.

Minoru Inaba, et al., "Hydrogen oxidation on partially immersed Nafion®–coated electrodes," Journal of Electroanalytical Chemistry 417 (1996), pp. 105–111. no month available.

Primary Examiner—Edna Wong
Attorney, Agent, or Firm—Stevens, Davis, Miller & Mosher, L.L.P.

[57] ABSTRACT

An electrode of solid polymer electrolyte fuel cells is produced by a step of preparing a mixed liquid containing an organic solvent, a noble metal catalyst-supporting carbon powder and a colloid of a solid polymer electrolyte having a particle size of from 1 nm to less than 400 nm, the colloid being adsorbed to the carbon powder and a step of forming an electrode by coating the mixed liquid on one side of a gas-diffusible layer. The solid polymer electrolyte is effectively adsorbed to the surface of the catalyst and thus a wide reaction area can be secured. Furthermore, thickness of the solid polymer electrolyte layer can be controlled to one in which hydrogen and oxygen can be easily diffused.

10 Claims, 5 Drawing Sheets ved patent 6,060,187

SOLID POLYMER TYPE FUEL CELL AND METHOD FOR MANUFACTURING THE SAME

BACKGROUND OF THE INVENTION

1. Field of the Invention

The present invention relates to a method for manufacturing an assembly of a solid polymer electrolyte membrane and electrodes and to an assembly manufactured by the method, and more particularly to a fuel cell which is made using the assembly and uses as a fuel a reducing agent such as pure hydrogen, modified hydrogen obtained from methanol or fossil fuels or methanol and as an oxidizing agent air or oxygen, and especially a fuel cell which uses a solid polymer as an electrolyte.

2. Description of the Related Art

One of the most important factors which govern the discharge performance of solid polymer type fuel cells constructed using an assembly of a solid polymer electrolyte membrane and electrodes is the reaction area at an interface of three phases formed by pores which are passages for feeding reaction gas, a solid polymer electrolyte having protonic conductivity due to containment of water, and an electrode material of electronic conductor at the interface between a solid polymer electrolyte membrane and an electrode.

Hitherto, in order to increase the three face interface, it has been attempted to apply a layer prepared by mixing and dispersing an electrode material and a solid polymer electrolyte to the interface between the membrane and a porous electrode. For example, JP-B-62-61118 and JP-B-62-61119 disclose a method which comprises coating a mixture of a solution of solid polymer electrolyte with a catalyst compound on a solid polymer membrane, hot pressing the coated membrane on an electrode material and then reducing the catalyst compound or carrying out the coating after the reduction and then carrying out the hot pressing.

JP-A-3-184266 uses a powder prepared by coating a solid polymer electrolyte on the surface of a polymer resin, and JP-A-3-295172 employs a method which comprises incorporating a powder of a solid polymer electrolyte into an electrode. JP-A-5-36418 discloses a method which comprises mixing a solid polymer electrolyte, a catalyst, a carbon powder and a fluoropolymer and forming the mixture into a film to form an electrode.

All of the above patent publications use alcohol solvents for the solutions of the solid polymer electrolyte. Furthermore, U.S. Pat. No. 5,211,984 reports a method which comprises preparing an inky dispersion comprising a solid polymer electrolyte, a catalyst and a carbon powder using glycerin or tetrabutylammonium salt as a solvent, casting the dispersion on a polytetrafluoroethylene (hereinafter referred to as "PTFE") film, and then transferring it onto the surface of a solid polymer electrolyte membrane or a method which comprises changing the exchanging group of a solid polymer electrolyte membrane to Na type, coating the above inky dispersion on the surface of the membrane, and heating and drying the coat at 125° C. or higher to again change the group to H type.

However, when a catalyst-supporting carbon powder and a water repellent material such as fluoropolyer or a carbon powder subjected to water repelling treatment are simultaneously added to the solid polymer electrolyte solution, much solid polymer electrolyte is adsorbed to the water repellent material or the carbon powder subjected to water repelling treatment, and accordingly the degree of contact between the solid polymer electrolyte and the catalyst becomes insufficient and nonuniform, and no sufficient reaction area can be ensured at the interface between the electrode and the ion-exchange membrane.

Moreover, in all of the above methods, it is difficult to coat the solid polymer electrolyte at a suitable thickness on the surface of the catalyst, and in fact the thickness of coat of the polymer electrolyte cannot be controlled. Therefore, there are problems that the catalyst cannot be sufficiently coated on the polymer electrolyte, resulting in a small reaction area or thickness of the coat is too large and diffusion route of hydrogen or oxygen becomes longer to cause increase of concentration over voltage.

Furthermore, when the dispersion with an alcoholic solvent is coated on a porous substrate or when the inky dispersion is coated on a porous substrate, the dispersion cannot be directly molded on the surface of the substrate as the dispersion penetrates or permeates into the inside of the substrate and thus, complicated processing techniques such as transferring are needed.

Moreover, the above-mentioned method of directly coating the inky dispersion on the surface of the membrane requires the complicated production technique of replacing the exchange group of the membrane many times.

"Journal of Electroanalytical Chemistry", 417 (1996) 105–111 mentions that the thinner thickness of polymer electrolyte layer on the catalyst surface gives the more easy occurrence of diffusion of hydrogen and oxygen, and according to FIG. 7, when the thickness is 400 nm, the highest characteristics are obtained. However, this is a result of experimentation conducted on a smooth Pt surface, and is not concerned with the thickness of the polymer electrolyte layer on the catalyst surface in the catalyst layer of porous electode.

The inventors have disclosed a method for manufacturing electrodes using colloid of solid polymer electrolyte in JP-A-7-183035 and JP-A-8-264190. The object of the present invention is to improve these inventions and to provide an assembly of a solid polymer electrolyte membrane and electrodes having further higher performances by severely specifying colloid particle size of the solid polymer electrolyte and controlling the thickness of the coat, and to provide a solid polymer type fuel cell made using said assembly.

SUMMARY OF THE INVENTION

The present invention relates to a method for manufacturing an assembly comprising a solid polymer electrolyte membrane and electrodes provided on both sides of the membrane, wherein at least one of the electrodes is formed by a step of preparing a mixed liquid containing an organic solvent, a noble metal catalyst-supporting carbon powder and a colloid of a solid polymer electrolyte having a particle size of from 1 nm to less than 400 nm, said colloid being adsorbed to the carbon powder and a step of forming an electrode by coating said mixed liquid on one side of a gas-diffusible layer.

The present invention further relates to an assembly manufactured by the above method and a solid polymer type fuel cell which uses the assembly.

According to the present invention, the solid polymer electrolyte is effectively adsorbed to the catalyst surface, whereby a wide reaction surface area can be secured. Moreover, the thickness of the polymer electrolyte layer can be controlled to such a degree that hydrogen and oxygen can easily diffuse therethrough, and thus a solid polymer type fuel cell of small concentration polarization and high performance can be obtained.

DETAILED DESCRIPTION OF THE INVENTION

Figure 1:
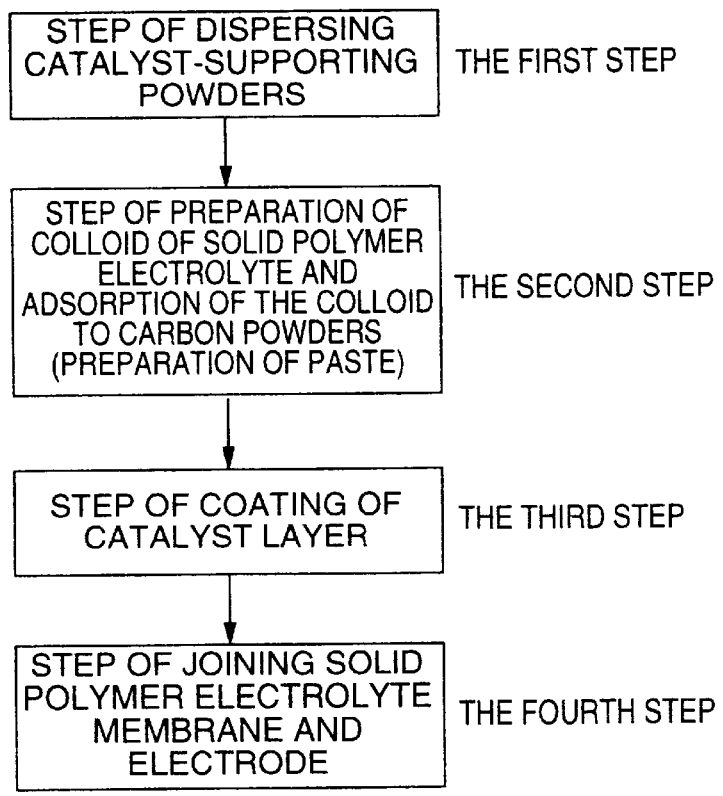
FIG. 1 is a block diagram which shows the steps of manufacture of the assembly of the present invention.

The present invention relates to a method for manufacturing an assembly comprising a solid polymer electrolyte membrane and electrodes provided on both sides of the membrane, wherein at least one of the electrodes is formed by a step of preparing a mixed liquid containing an organic solvent, a noble metal catalyst-supporting carbon powder and a colloid of a solid polymer electrolyte having a particle size of from 1 nm to less than 400 nm, said colloid being adsorbed to the carbon powder and a step of forming an electrode by coating said mixed liquid on one side of a gas-diffusible layer. In more detail, as shown in FIG. 1, the steps of manufacture of the assembly may include a first step of preparing a dispersion by dispersing a noble metal catalyst-supporting carbon power in an organic solvent, a second step of obtaining a mixed liquid by mixing this dispersion with an alcoholic solution of a solid polymer electrolyte to produce a colloid of the solid electrolyte having a particle size of from 1 nm to less than 400 nm and simultaneously adsorb the colloid to the carbon powder, a third step of making an electrode by coating the mixed liquid on one side of a gas-diffusible layer, and a fourth step of pressing the electrode to at least one side of a solid polymer electrolyte membrane to integrally join them.

Moreover, the steps of manufacture of the assembly may include a first step of preparing a colloidal dispersion by mixing an organic solvent and an alcoholic solution of a solid polymer electrolyte to produce a colloid having a particle size of from 1 nm to less than 400 nm, a second step of mixing said colloidal dispersion with a noble metal catalyst-supporting carbon powder to prepare a mixed liquid in which the colloid is adsorbed to the carbon powder, and the above third and fourth steps.

Figure 2:
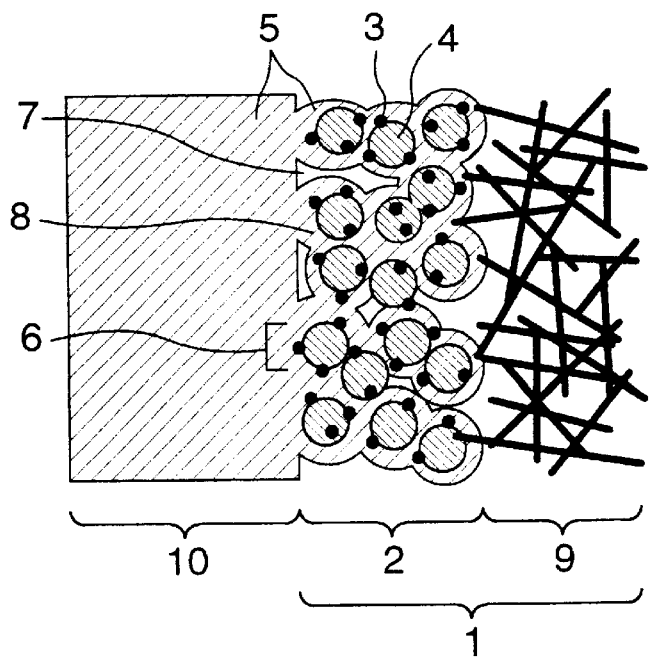
FIG. 2 is a schematic sectional view of the electrode in the example of the present invention.

According to the above method, the colloid of solid polymer electrolyte having a severely adjusted particle size can be uniformly adsorbed to carbon powder, and therefore it becomes possible to disperse catalyst fine particles 3, carbon fine powders 4 and solid polymer electrolyte 5 in such a state that they uniformly adhere to each other inside the catalyst layer 2 of electrode 1 as shown in the schematic sectional view of the electrode of FIG. 2.

When the thickness of the coat of the solid polymer electrolyte is too large, the diffusion route of hydrogen and oxygen up to the catalyst surface becomes long to increase concentration polarization of electrode reaction, and when it is too small, the transfer route of the proton becomes insufficient to cause increase of internal resistance of the electrode. In the present invention, the thickness of the coat can be controlled by adjusting the particle size of the colloid of the solid polymer electrolyte.

According to such construction of the catalyst layer 2, the three channels of gas channel 7 formed by the void between the carbon powders 4 which is a passage for feeding a fuel gas such as hydrogen or an oxidizing agent gas such as oxygen, proton channel 8 formed by the hydrated solid polymer electrolyte 5, and electron channel 6 formed by mutual connection of the carbon fine powders can be efficiently formed in close proximity to each other inside the same catalyst layer. In FIG. 2, 9 indicates a gas-diffusible layer and 10 indicates a solid polymer electrolyte.

According to the present invention, feed of hydrogen and oxygen gas and transfer of proton and electron can be carried out simultaneously and smoothly in a wide range by the following reaction at the hydrogen electrode:

and the following reaction at the oxygen electrode:

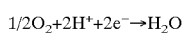

Therefore, the reaction rate and the reaction area are increased.

When the colloid particle size of the polymer electrolyte is less than 400 nm, the colloidal polymer electrolyte layer is adsorbed widely and uniformly to the catalyst surface, and thus a polymer electrolyte layer superior in diffusion of hydrogen and oxygen gas can be formed. The critical particle size for the formation of colloid is 1 nm or more. Therefore, the colloid particle size of the polymer electrolyte is from 1 nm to less than 400 nm. The carbon powders used as a carrier for catalyst include those which are great in pore volume of small pores of less than 10 nm, such as carbon black, and in order to form a three-dimensional electrolyte network in the electrode, the colloid particle size is preferably 10 nm or more. Accordingly, the colloid particle size is more preferably 10 nm or more and less than 400 nm.

The colloid particles may be either monodisperse or polydisperse. Average particle size of primary particles of colloid is preferably 10 nm or more and less than 130 nm, more preferably 10 nm or more and less than 70 nm.

Since the electrolyte layer on the surface of the catalyst layer is formed with the colloid particles being adsorbed to the catalyst surface, the thickness of the electrolyte layer usually depends on the size of primary particles of colloid. The colloid particles may be adsorbed in the form of a multilayer, and hence the thickness is about 1–3 times the average particle size of primary particles of colloid. Specifically, the thickness of the electrolyte layer is from 10 nm to less than 400 nm, preferably from 10 nm to less than 200 nm, more preferably from 10 nm to less than 50 nm.

The size of the colloid can be adjusted by changing the molecular weight and molecular structure of the polymer electrolyte, and the kind and composition of organic solvents at the step of preparation of the colloid.

As the organic solvents, there may be suitably used those having a polar group other than hydroxyl group in the molecule and having a carbon chain of 1–8 carbon atoms which bond to the polar group or having a dielectric constant of 3–10 as disclosed in U.S. Pat. No. 5,474,875. U.S. Pat. No. 5,474,875 is incorporated herein by reference.

Mixing ratio in weight of organic solvent and polymer electrolyte is preferably 10:1–100:1, more preferably 20:1–70:1, and mixing temperature is preferably 30° C. or lower, more preferably room temperature.

Furthermore, in order to enhance feeding ability of reaction gases, carbon powders subjected to water repelling treatment, for example, carbon powders to which 25–70% in weight ratio of a fluoropolymer is added, may be added to the carbon powders of the present invention. Amount of the water repelled carbon powders is 10–50% by weight of the carbon powders supporting the noble metal catalyst.

Examples of the present invention will be explained referring to the accompanying drawings.

EXAMPLE 1

In the first step, 50 g of carbon fine powders supporting 10–25% by weight of a platinum catalyst were dispersed in n-butyl acetate ($CH_3COOCH_2(CH_2)_2CH_3$) as an organic solvent.

In the second step, a 9% ethanolic solution of FLEMION manufactured by Asahi Glass Co., Ltd. as a solid polymer electrolyte in an amount of 1 g for 60 g of n-butyl acetate was mixed with the above dispersion to produce a white colloid. The colloidal solid polymer electrolyte was immediately adsorbed to the surface of the carbon fine powders supporting the catalyst. After a while from completion of addition of all polymer electrolyte solution, stirring was stopped and the supernatant liquid became transparent. When the carbon powders adsorbing the solid polymer electrolyte were allowed to collide with each other by an ultrasonic dispersing device, the adsorbed polymer was also adsorbed to other carbon powders, resulting in bridging agglomeration and the dispersion became pasty.

In the third step, the resulting paste was coated on a carbon paper substrate to which 20–60% by weight of a fluoropolymer was previously added (manufactured by Toray Industries, Inc.). The bridging agglomeration which occurred in the second step prevented the catalyst fine particles from penetrating into the carbon paper and only the solvent was removed and filtered, whereby it became possible to mold the catalyst layer on the surface of the substrate.

In the fourth step, the above electrodes were hot pressed on both sides of NAFION membrane manufactured by DuPont de Nemours, E.,I. Co., by application of a pressure of 5–100 kg/cm² at 120–200° C. to make a cell A.

EXAMPLE 2

Cell B was produced in the same manner as in Example 1, except that "5% NAFION solution" manufactured by Aldrich Chemical Co., Ltd. was used as the solid polymer electrolyte in the second step.

COMPARATIVE EXAMPLE

Cell X was produced in the same manner as in Example 1, except that "5% NAFION solution" manufactured by Aldrich Chemical Co., Ltd. was used as the solid polymer electrolyte and the mixing was carried out under heating at 50° C. in the second step.

Figure 3:
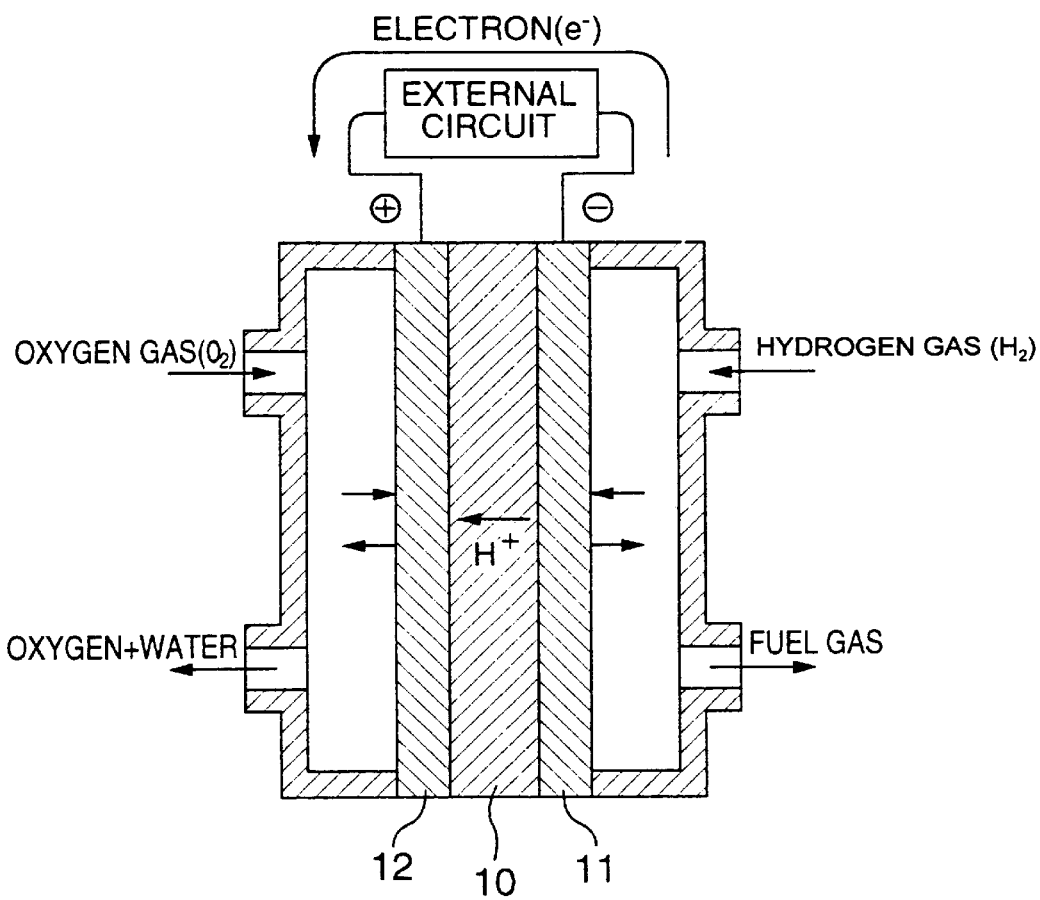
FIG. 3 is a schematic sectional view of a unit cell of the solid polymer type fuel cell of the present invention.

FIG. 3 shows a schematic sectional view of a unit cell of the manufactured solid polymer type fuel cell. In FIG. 3, 10 indicates a solid polymer electrolyte membrane. In the above Examples and Comparative Example, "NAFION 112 membrane" manufactured by DuPont de Nemours,E.I., Co. was used as the solid polymer electrolyte membrane 10. In FIG. 3, 11 and 12 indicate a porous negative electrode and a porous positive electrode, respectively. The amount of the solid polymer electrolyte added was 1.0 mg/cm² per apparent electrode area for both the electrodes, but the same characteristics were obtained with addition of the electrolyte in the range of 0.1–3.0 mg/cm². The amount of platinum was 0.5 mg/cm² similarly per apparent electrode area. Discharge test was conducted by feeding hydrogen gas moisturized at 90° C. to the negative electrode side and oxygen gas moisturized at 80° C. to the positive electrode side from the inlet of the cell toward the outlet of the cell, respectively.

Figure 4:
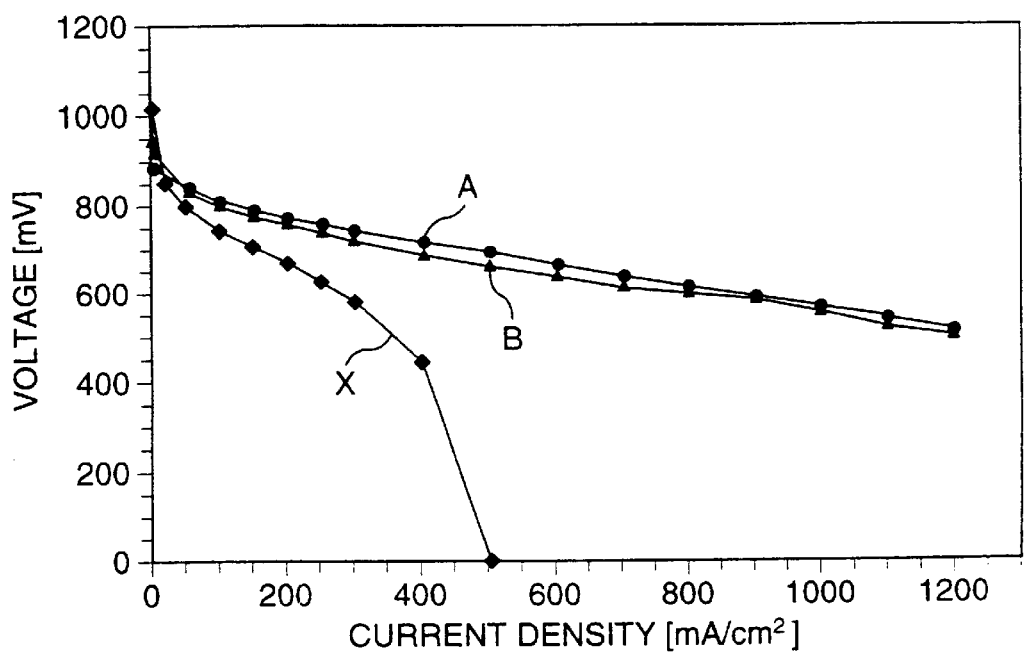
FIG. 4 is a graph which shows voltage-current characteristics of a fuel cell.
Figure 5:
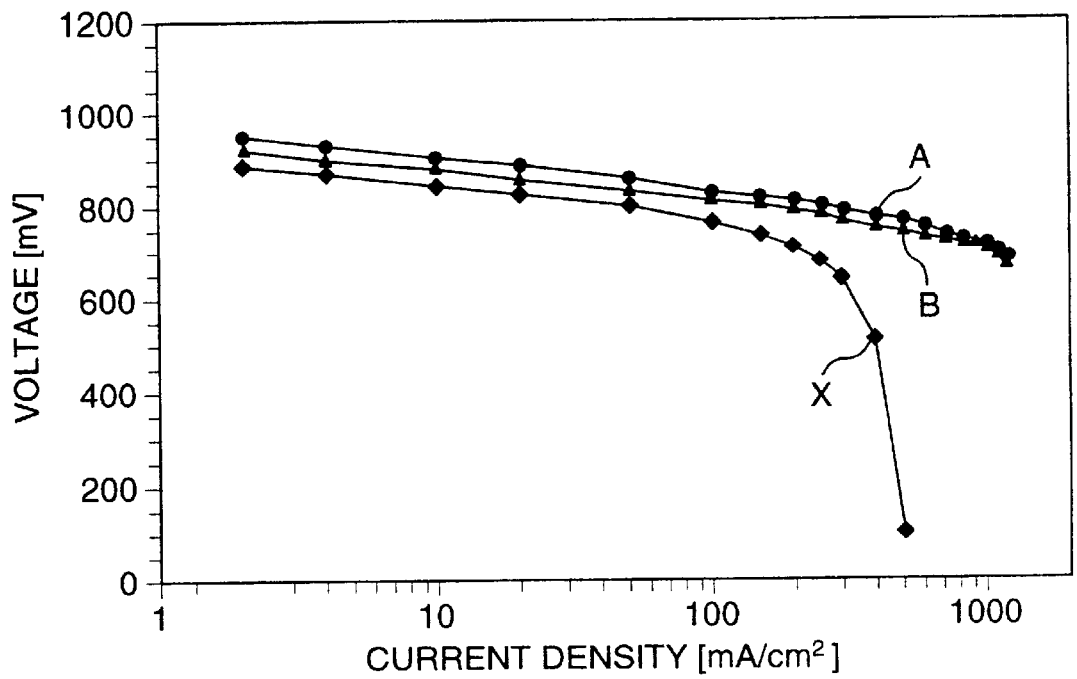
FIG. 5 is a graph which shows voltage-current characteristics of a fuel cell.
Figure 6:
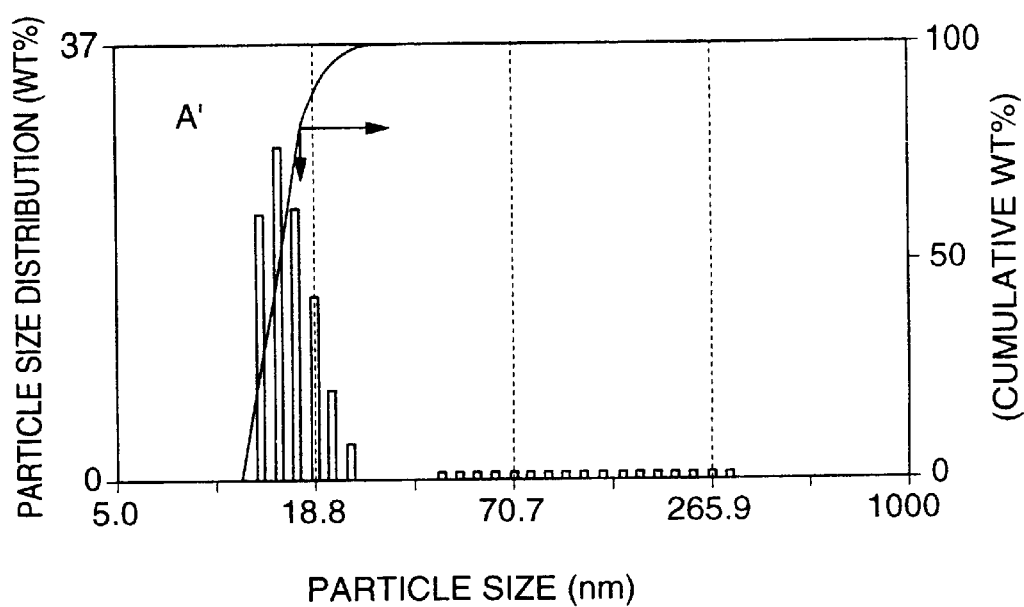
FIG. 6 is a graph which shows a particle size distribution of the solid polymer electrolyte of Example 1 of the present invention.
Figure 7:
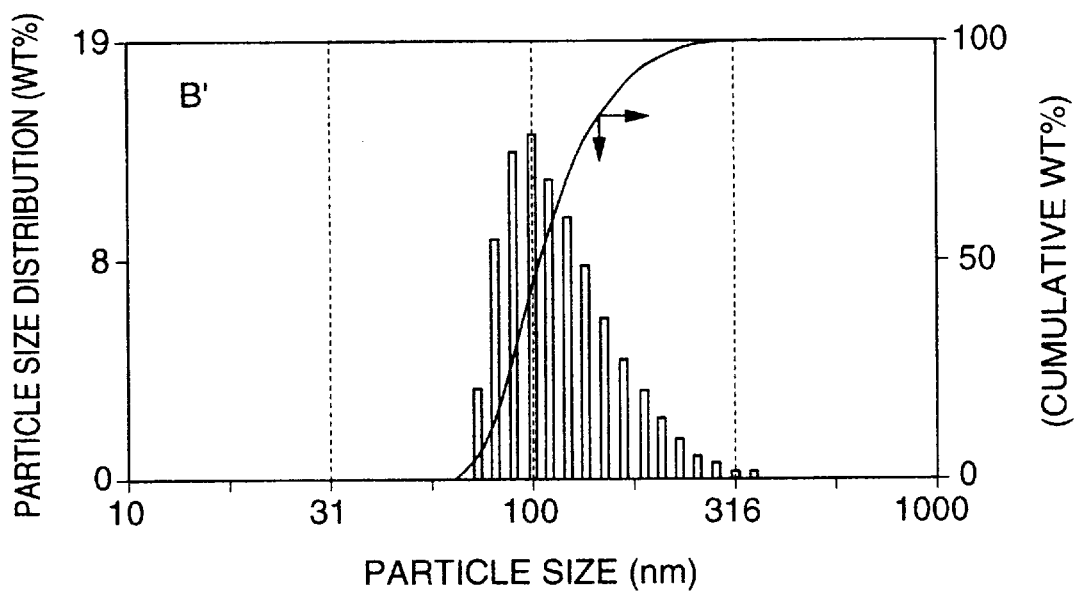
FIG. 7 is a graph which shows a particle size distribution of the solid polymer electrolyte of Example 2 of the present invention.
Figure 8:
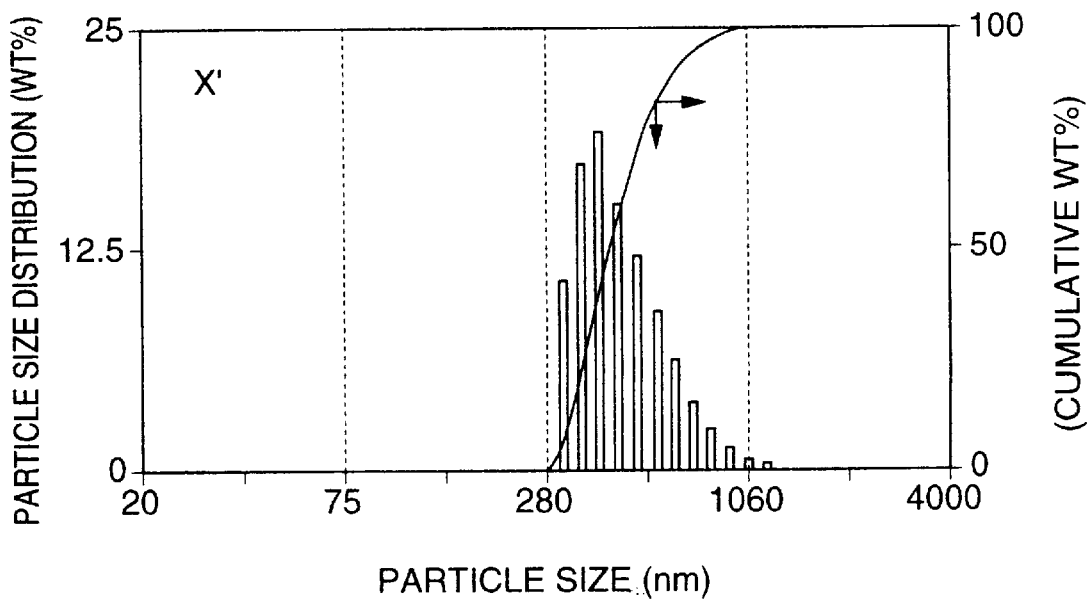
FIG. 8 is a graph which shows a particle size distribution of the solid polymer electrolyte of comparative example.

FIG. 4 shows voltage-current characteristics of the cells made in Examples 1 and 2 and Comparative Example. Current densities of cells A and B of the present invention and cell X of Comparative Example at 500 mV were 1200, 1150, and 360 mA/cm², respectively. The cells of the present invention showed characteristics of more than 3 times that of Comparative Example. FIG. 5 shows characteristics obtained by Tafel plotting the respective characteristics of FIG. 4. Current densities of cells A and B of the present invention and cell X of Comparative Example at 850 mV were 60, 26, and 10 mA/cm², respectively. The straight line portion of the Tafel plotted characteristics shows activation polarization, namely, characteristics of the region where polarization caused by charge transport determines the rate of reaction, and current density of this region at a given voltage can approximate to the reaction area of the electrode. Therefore, it was found that cell A of Example 1 of the present invention had a reaction area of 6 times that of cell X of Comparative Example, and cell B had a reaction area of 2.6 times that of cell X. FIGS. 6–8 show particle size distributions of colloids A', B', and X' prepared by mixing the solid polymer electrolyte used in Examples 1 and 2 and Comparative Example with n-butyl acetate solvent, which were measured by cumulant analysis using a dynamic light scattering photometer DLS-7000 manufactured by Ohtsuka Denshi Co., Ltd. Table 1 shows average particle size, primary particle size, range of particle size distribution and polydisperse index of the colloid particles. A polydisperse index of 0.1 or less means monodisperse, and that of more than 0.1 means polydisperse.

TABLE 1

|  | A' | B' | X' |
|---|---|---|---|
| Average particle size of colloid (nm) | 102 | 154 | 514 |
| Average particle size of primary particles (nm) | 16 | 122 | 424 |
| Range of particle size distribution (nm) | 13 ~ 340 | 73 ~ 351 | 282 ~ 1200 |
| Polydisperse index | 0.207 | 0.123 | 0.073 |

It was seen that colloid A' of Example 1 had a distribution range of 13–340 nm and an average particle size of 102 nm, and was in polydisperse state, but most of the colloid was occupied by particles of about 16 nm. It was seen that colloid B' of Example 2 had a distribution range of 73–351 nm and an average particle size of 154 nm, was in slightly polydisperse state, and had an average particle size of primary particles of about 122 nm. On the other hand, it was seen that colloid X' of Comparative Example comprised particles of monodisperse state having a distribution range of 282–1200 nm and having a primary particle size of about 424 nm.

Since the electrolyte layer on the surface of catalyst is formed by the adsorption of primary particles of the above-mentioned colloid to the surface of catalyst, the thickness of the layer depends on the primary particles of the colloid, and besides, the primary particles are sometimes adsorbed in the form of multilayer, and therefore, the thickness was 1–3 times the particle size. As a result, the thickness of the electrolyte layer was 122–366 nm in the case of B' and 16–48 nm in the case of A'. On the other hand, it was 424 nm or more in the case of X'.

It can be seen from the results of particle size distribution of colloid particles of the solid polymer electrolyte that colloids having various particle size can be prepared by changing kind of solid polymer materials, mixing conditions and the like by the method of the present invention. It can be seen from the results of FIGS. 4 and 5 that state of colloid greatly affects the cell characteristics. Cells A and B of Examples 1 and 2 in which the particle size of colloid was distributed in the range of from 10 nm to less than 400 nm showed high characteristics and the comparative cell X in which the colloid particles had an average particle size of 400 nm or more showed low characteristics. It is considered that in cells A and B, the solid polymer electrolyte was adsorbed widely, thinly and uniformly to the surface of catalyst and the polymer electrolyte layer was formed in such a thickness that hydrogen and oxygen gas can satisfactorily diffuse therethrough. On the other hand, cell X had a small reaction area and showed low characteristics in the high current density region. It is considered that this is because since colloid X' was large, the solid polymer electrolyte layer could not be uniformly adsorbed to the surface of catalyst to reduce the reaction area and since thickness of the adsorbed polymer electrolyte layer was great, diffusion route of hydrogen and oxygen was long, resulting in increase of concentration overvoltage to cause deterioration of characteristics in the high current density region. That is, it is considered that an optimum polymer electrolyte layer can be formed by the present invention.

Figure 9:
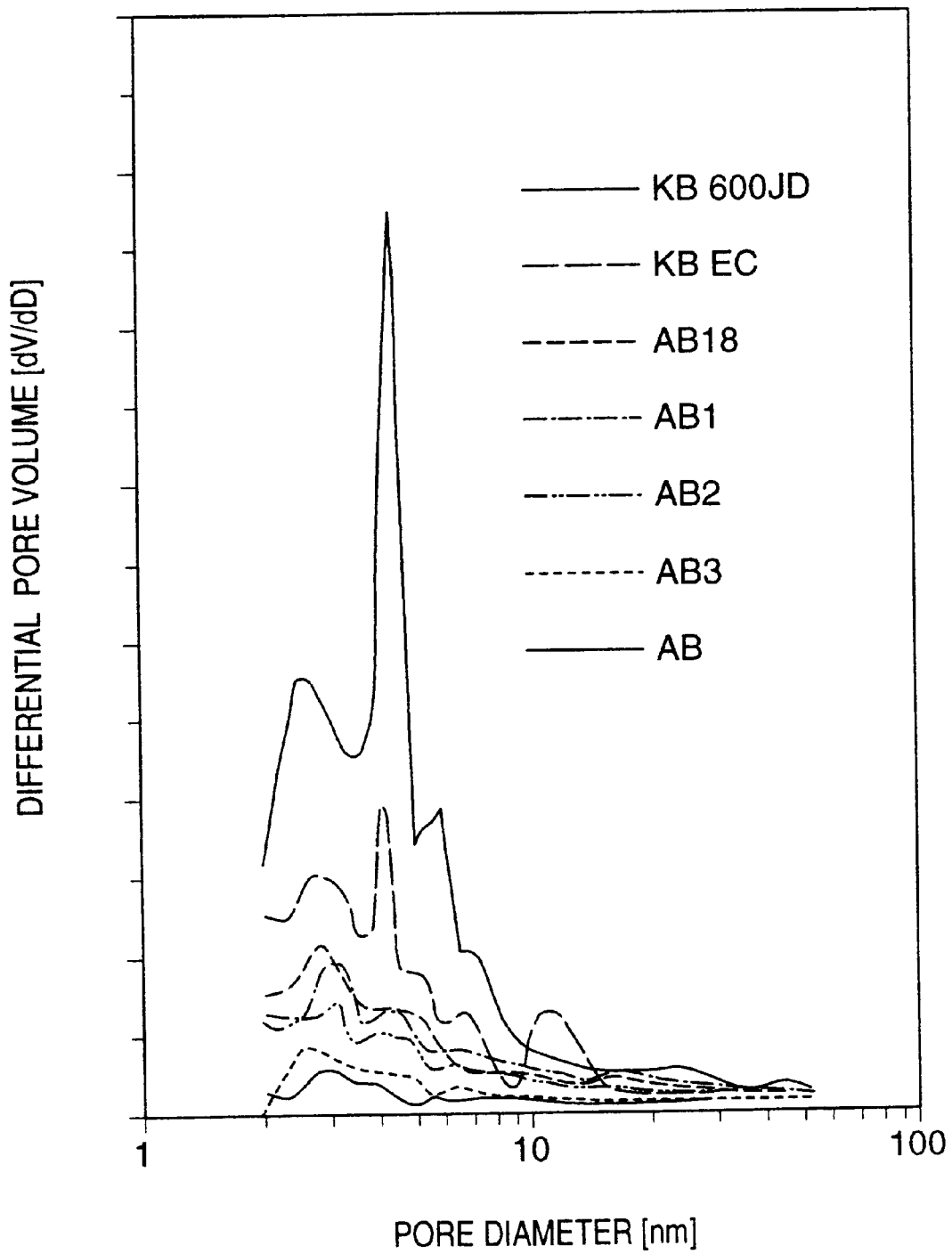
FIG. 9 is a graph which shows a pore distribution of carbon black.

FIG. 9 shows results of pore distribution of typical carbon blacks used as a carrier for catalyst which were obtained by nitrogen gas adsorption method. KETJEN BLACK 600D (KB600JD) and KETJEN BLACK EC (KBEC) manufactured by Lion Co., Ltd. and acetylene blacks (AB, AB1, AB2, AB3, and AB18) manufactured by Denki Kagaku Kogyo Co., Ltd. were used as the carbon blacks. It can be seen from FIG. 9 that these carbon blacks have a large volume for the pores of 10 nm or less. Since primary particle size of carbon black is 10 nm or more, these pores can be considered to be those formed on the surface of carbon black particles. Therefore, it is preferred for forming a three-dimensional electrolyte network in the electrode that thickness of the solid polymer electrolyte layer formed on these carbon blacks is 10 nm or more.

The kind and amount of the above-mentioned organic solvents can be experimentally optionally selected so that particle size of the colloid is in the range of from 1 nm to less than 400 nm. The Examples of the present invention describe the representative values and do not restrict the present invention.

Moreover, in the above Examples, solutions of FLEMION and NAFION were used as representative examples of polymers comprising a copolymer of tetrafluoroethylene and perfluorovinyl ether as the solid polymer electrolyte, but the polymers are not limited to these examples as far as they are polymer electrolyte having proton exchange group, and the similar effects were obtained by using polymers of different molecular structures. For example, there may be used perfluorovinyl ethers, polymers of different side chain molecular length, polymers comprising a copolymer of styrene and vinyl benzene, and other hydrocarbon polymer electrolytes.

Furthermore, in the above Examples, a hydrogen-oxygen fuel cell was taken up, but the present invention can also be applied to fuel cells which use modified hydrogen obtained from methanol, natural gases, naphtha, etc., fuel cells which use air as oxidizing agent, and liquid fuel cells which directly use methanol as a fuel.

Moreover, in the above Examples, fuel cells were constructed using an assembly of a solid polymer electrolyte and an electrode, but the assembly can be effectively applied to generators or purifiers of oxygen, ozone, hydrogen, etc. and various gas sensors such as oxygen sensor and alcohol sensor.

As explained above, according to the present invention, contact between the solid polymer electrolyte and the catalyst in the electrode and dispersing state of them in the electrode can be improved, and the three channels of the gas channel formed by the voids between fine carbon powders which is a channel for feeding fuel gases such as hydrogen and oxidizing agent gases such as oxygen, the proton channel formed by the hydrous solid polymer electrolyte and the electron channel formed by mutual connection of carbon fine powders are formed very close to each other in the same catalyst layer, and the reaction area is increased.

Therefore, feeding of hydrogen and oxygen gas and transfer of proton and electron are carried out smoothly and in a wide range, and thus the present invention can provide solid polymer type fuel cells which exhibit higher discharge performance.

What is claimed is:

1. A method for producing an assembly comprising a solid polymer electrolyte membrane having electrodes on both sides of the membrane, said method comprising:
   forming at least one of the electrodes by the steps of
   (a) preparing a mixed liquid comprising an organic solvent, a noble metal catalyst-supporting carbon powder, and a colloid of a solid polymer electrolyte having a particle size distribution range of from 1 nm to less than 400 nm, said colloid being adsorbed to the carbon powder, and
   (b) coating said mixed liquid on one side of a gas-diffusible layer.

2. A method according to claim 1, wherein step (a) comprises
   preparing a dispersion by dispersing the noble metal catalyst-supporting carbon powder in the organic solvent, and
   mixing said dispersion and an alcoholic solution of a solid polymer electrolyte to produce the colloid of the solid polymer electrolyte and simultaneously adsorb the colloid to the carbon powder.

3. A method according to claim 1, wherein step (a) comprises
   preparing a colloid dispersion by mixing the organic solvent and an alcoholic solution of a solid polymer electrolyte, and
   mixing the colloid dispersion and the noble metal catalyst-supporting carbon powder to adsorb the colloid to the carbon powder.

4. A method according to claim 1, wherein the particle size of the colloid is from 10 nm to less than 400 nm.

5. An assembly produced by the method according to claim 4.

6. A solid polymer electrolyte fuel cell made using the assembly according to claim 5.

7. A method according to claim 1, wherein an average particle size of primary particles of the colloid is from 10 nm to less than 130 nm.

8. A method according to claim 1, wherein the carbon powder contains water repelled carbon powder.

9. An assembly produced by the method according to claim 1, wherein an electrolyte layer formed with particles of the colloid has a thickness of from 10 nm to less than 400 nm.

10. A solid polymer electrolyte fuel cell made using the assembly according to claim 9.

* * * * *